United States Patent
Mancosu et al.

(10) Patent No.: US 7,243,533 B2
(45) Date of Patent: Jul. 17, 2007

(54) MOVABLE UNIT AND SYSTEM FOR SENSING AT LEAST ONE CHARACTERISTIC PARAMETER OF A TYRE

(75) Inventors: Federico Mancosu, Milan (IT); Fabio Romeo, Monza (IT); Massimo Brusarosco, Cesano Boscone (IT); Anna Paolo Fioravanti, Monza (IT)

(73) Assignee: Pirelli Pneumatici S.p.A., Milan (IT)

( * ) Notice: Subject to any disclaimer, the term of this patent is extended or adjusted under 35 U.S.C. 154(b) by 0 days.

(21) Appl. No.: 10/518,795

(22) PCT Filed: Jun. 28, 2002

(86) PCT No.: PCT/IT02/00428

§ 371 (c)(1),
(2), (4) Date: Aug. 10, 2005

(87) PCT Pub. No.: WO2004/002758

PCT Pub. Date: Jan. 8, 2004

(65) Prior Publication Data
US 2006/0090556 A1   May 4, 2006

(51) Int. Cl.
*G01M 17/02* (2006.01)

(52) U.S. Cl. ............................ 73/146; 73/146.2

(58) Field of Classification Search ....... 73/146–146.8; 340/444–447

See application file for complete search history.

(56) References Cited

U.S. PATENT DOCUMENTS

| 3,981,342 A | 9/1976 | Farber et al. | |
|---|---|---|---|
| 4,160,234 A | * 7/1979 | Karbo et al. | 340/443 |
| 4,768,937 A | 9/1988 | Singh | |

(Continued)

FOREIGN PATENT DOCUMENTS

DE  44 02 136 A1  7/1995

(Continued)

OTHER PUBLICATIONS

Shearwood, C. et al., "Development of an Electromagnetic Microgenerator," Electronics Letters, vol. 33, No. 22, p. 1883, (Oct. 23, 1997).

(Continued)

*Primary Examiner*—Edward Lefkowitz
*Assistant Examiner*—Jermaine Jenkins
(74) *Attorney, Agent, or Firm*—Finnegan, Henderson, Farabow, Garrett & Dunner, L.L.P.

(57) ABSTRACT

A system for sensing at least one characteristic parameter of a tyre fitted to a vehicle includes a movable unit and a fixed unit. The movable unit is combined with the tyre and includes a device for sensing the at least one characteristic parameter, a device for transmitting a signal out of the tyre that relates to the at least one characteristic parameter, and a device for generating electrical energy. The fixed unit is combined with the vehicle and includes a device for receiving signals from the movable unit. The electrical energy generating device is capable of supplying electrical energy to the sensing device and to the transmitting device. The electrical energy generating device includes a capacitor that charges itself with electrical energy in response to mechanical stresses applied to the tyre. The movable unit and a vehicle wheel are also disclosed.

20 Claims, 5 Drawing Sheets

U.S. PATENT DOCUMENTS

| | | | |
|---|---|---|---|
| 4,872,822 A | 10/1989 | Pizzorno | |
| 4,895,610 A | 1/1990 | Egan | |
| 4,913,209 A | 4/1990 | Hong et al. | |
| 5,540,092 A | 7/1996 | Handfield et al. | |
| 5,562,787 A | 10/1996 | Koch et al. | |
| 5,825,286 A | 10/1998 | Coulthard | |
| 6,199,575 B1 * | 3/2001 | Widner | 137/227 |
| 6,217,683 B1 | 4/2001 | Balzer et al. | |
| 6,662,642 B2 | 12/2003 | Breed et al. | |

FOREIGN PATENT DOCUMENTS

| | | |
|---|---|---|
| DE | 199 53 488 C 1 | 5/2001 |
| EP | 0 127 998 A2 | 12/1984 |
| EP | 0 199 064 B1 | 10/1986 |
| EP | 0 242 840 B1 | 10/1987 |
| EP | 0 928 680 A1 | 7/1999 |
| EP | 0 928 680 B1 | 7/1999 |
| EP | 0 928 702 B1 | 7/1999 |
| WO | WO 99/29524 | 6/1999 |
| WO | WO 00/02741 | 1/2000 |
| WO | WO 01/80327 A1 | 10/2001 |

OTHER PUBLICATIONS

Butler, J. T. et al., "Adapting Multichip Module Foundries for MEMS Packaging," The International Journal of Microcircuits and Electronic Packaging, vol. 21, No. 2, Second Quarter, pp. 212-218, (1998).

English translation of DE 44 02 136 A1.

* cited by examiner

MOVABLE UNIT AND SYSTEM FOR SENSING AT LEAST ONE CHARACTERISTIC PARAMETER OF A TYRE

CROSS-REFERENCE TO RELATED APPLICATIONS

This application is a national-phase entry under 35 U.S.C. § 371 from International Application No. PCT/IT2002/000428, filed Jun. 28, 2002, at the Italian Patent Office, the content of which is relied upon and incorporated herein by reference.

BACKGROUND OF THE INVENTION

1. Field of the Invention

The present invention relates to a system for monitoring characteristic parameters of a tyre fitted to a vehicle.

In particular, the present invention relates to the possibility of sensing characteristic parameters, such as for example pressure, temperature and accelerations, inside a tyre using a sensor placed inside the tyre itself.

2. Description of the Related Art

A wheel is the connection between the vehicle and the road; it performs the function of providing pneumatic suspension for the vehicle and its load and providing, through the tyre, satisfactory behaviour on the road. The suspension of the vehicle is provided by the volume of compressed air contained inside the wheel.

A tyre comprises an internally hollow toroidal structure formed by a plurality of components, in the first place a textile or metallic carcass ply, the edges of which are attached to at least one pair of annular reinforcing cores known as bead wires, which are circumferentially inextensible and are inserted in two beads each defined along an internal circumferential edge of the carcass in order to anchor the tyre to the corresponding supporting rim.

The carcass ply includes a supporting structure that runs axially from one bead to the other to form a toroidal structure comprising a plurality of textile or metallic cords embedded in a layer of elastomeric material. In tyres of the so-called "radial" type, the abovementioned cords essentially lie in planes containing the axis of rotation of the tyre.

Forming a ring around this carcass are an annular superstructure known as the belt structure, normally made up of one or more strips of rubberized fabric wound on top of each other to define a so-called "belt pack", and a tread band of elastomeric material wrapped around the belt pack and moulded with a relief design for rolling contact of the tyre with the road. Two elastomeric side walls are also placed on the carcass, in axially opposite lateral positions, each extending radially outwards from the outer edge of the corresponding bead.

In tyres of the so-called "tubeless" type, i.e. those that require no inner tube when in use, the inside surface of the carcass is normally covered with a so-called "liner", which is one or more layers of elastomeric material impermeable to air. Lastly, the carcass can include other known components, i.e. edges, shims and fillers depending on the particular design of tyre.

A pneumatic vehicle wheel comprises a tyre defining a toroidal cavity and mounted on a corresponding rim, which has a bottom surface provided with a central well and two bead seats against which the tyre beads come into abutment and which are each axially defined between an extreme radial surface (shoulder) in an axially external position and an opposing, axially internal, annular projection which locks the bead on the corresponding seat.

In a "tubeless" tyre, the compressed air is contained between the tyre and the supporting rim. The liner on the inside surface of the tyre keeps the air at pressure inside the tyre. This tyre is inflated through an inflation valve which is usually positioned on the drop centre of said rim.

A tyre of this type is described for example in Patent Application EP928680.

Another way of maintaining the suspension capacity of the tyre is to use an inner tube inserted between the tyre and the rim and inflated with compressed air which is injected into the tube through an inflation valve projecting out through the wheel.

The inner tube, inserted between the tyre and rim, comprises a tubular body expandable to give toric shape. It is generally made of elastomeric material and inflates through an inflation valve.

The inflation valve of the inner tube usually includes a base for attachment to the inner tube and a cylindrical envelope (shank) fixed to the base and containing the mechanism that has to be activated for inflation and deflation operations.

An incorrectly inflated tyre reduces the efficiency of the vehicle: in particular, it causes increased fuel consumption, poorer handling and greater tyre wear, to cite only a few of the most serious drawbacks.

It is therefore of the greatest importance to be able to continually monitor the pressure in the tyres of the vehicle. Also, if it is wished to check the behaviour of a moving tyre, other parameters can be monitored, such as, for example, the accelerations and deformations that take place within a tyre.

U.S. Pat. No. 5,540,092 discloses a system for monitoring the pressure in a tyre comprising a pressure sensing unit and a unit for transmitting an encoded signal to the vehicle on which the tyre is fitted. The transmitting unit may be mounted inside or outside of the tyre. The transfer of this coded signal takes place by inductive coupling between the transmission unit and a fixed antenna. A battery powers this transmission unit.

U.S. Pat. No. 5,562,787 discloses a method for monitoring the conditions of a vehicle tyre, e.g. the pressure and temperature of the air in the tyre. The method uses a programmable self-powered device mounted on the inside surface of the tyre or inserted in the wall of the rim on which said tyre is mounted. The device comprises a power source that can be made active or inactive using a switching device, a sensor for monitoring said information, an integrated circuit, an amplifier and an antenna. A transmitter-receiver located on the vehicle or in a remote position interrogates the programmable self-powered device, which answers with a radio-frequency signal containing the required information. The programmable self-powered device is activated by said remote transmitter/receiver which instructs the switching device to make the power source active.

U.S. Pat. No. 6,217,683 discloses a tyre monitoring device in which a module for monitoring information about the state of the tyre is inserted in the tyre itself and attached to the inside surface of the tyre by a fixing mechanism. This fixing mechanism comprises a fixed part attached to the surface of the tyre carcass, and another part attached to said module. Said first and second parts together keep said module in contact with the inside surface of the tyre carcass. One application of the monitoring system is to measure the tyre pressure. The measurement is transmitted to the outside by radiofrequency signal.

Patent application WO 9929524 discloses a tyre pressure sensor encapsulated in elastomeric material and attached in the toroidal zone of the tyre, preferably in the vicinity of the equatorial plane of said tyre. The sensor is attached to the inner surface of the tyre by an adhesive or is attached by the curing of the elastomeric material during manufacture of the tyre.

SUMMARY OF THE INVENTION

The Applicant has observed that the abovementioned methods for measuring characteristic parameters of a tyre require devices for transmitting out of the tyre a signal corresponding to the measurements made.

The Applicant has seen that the amount of information associated with the sensing of characteristic parameters of a tyre is such as to require the transmission of a signal having an extended pass-band. In particular, in order to transmit a signal from the tyre, such as an acceleration signal, which can be decoded outside of the tyre and interpreted in a meaningful way, sampled transmission of this signal must occur at a frequency of at least 6 kHz (at least one sample every $1.6 \times 10^{-4}$ sec).

For example, each sample requires the transmission of at least 10 Bits (8 bits of information plus 2 control bits), thus necessitating the transmission of 60 000 bits/sec.

The transmission of so much information requires a large amount of electrical power which must be supplied on the inside of the tyre, for example by a battery, continuously over a long period of time, if, for example, the intention is to monitor tyre deformations in order to control the motion of the vehicle.

Also, the Applicant has observed that to transmit such an amount of information from inside the tyre requires, for example, 0.5 watts of electrical power to be available inside the tyre. This electrical power can only be supplied by a large, heavy battery, which could only be inserted with difficulty into a tyre.

The Applicant has found that by generating the electrical energy necessary to sense these parameters, code the corresponding signals and transmit these signals following coding or preprocessing inside the tyre, there is no need to use batteries requiring periodical replacement and the consequent work of a technician trained to carry out this replacement. This electrical energy is conveniently generated by exploiting the movement of the tyre.

The movable unit is of small dimensions and limited weight and therefore has little influence on the behaviour of the tyre while the vehicle is in motion. The Applicant has used an MEMS technology (Micro-Electro-Mechanical Systems) whereby mechanical components and electronic components can be integrated on the same substrate (wafer). To make a device with MEMS technology, a wafer is used, preferably of silicon, on which micromechanical structures integrated with electronic structures for controlling/processing an electrical signal connected with said mechanical structure are made by photolithography followed by chemical etching.

A first aspect of the present invention relates to a system for sensing at least one characteristic parameter of a tyre fitted to a vehicle comprising:

a movable unit combined with said tyre, said movable unit comprising a device for sensing said at least one characteristic parameter and a device for transmitting out of the tyre a signal relating to said at least one characteristic parameter, a fixed unit combined with said vehicle that includes a device for receiving from said movable unit, characterized in that said movable unit comprises an electrical energy generating device capable of supplying said sensing device and said transmitting device, that comprises a capacitor that charges itself with electrical energy in response to the mechanical stresses applied to said tyre.

Preferably, said capacitor comprises a fixed plate and a movable plate which move with respect to each other in response to said stresses.

Preferably, said fixed plate and said movable plate can vary their distance in response to said stresses.

Preferably, said fixed plate and said movable plate are connected to each other by a pair of springs.

In particular, said fixed plate and said movable plate are connected to a fixed support and to a movable support, respectively.

Preferably, the movement of this movable plate is bounded by a pair of end stop elements.

Preferably, said sensing device, said transmitting device, said processing unit and said generating device are produced on a substrate.

Preferably, said movable unit is produced by MEMS technology.

Another aspect of the present invention relates to a movable unit for sensing at least one characteristic parameter of a tyre fitted to a vehicle comprising a device for sensing said at least one characteristic parameter and a device for transmitting out of the tyre a signal relating to said at least one characteristic parameter, characterized in that it comprises an electrical energy generating device capable of supplying said sensing device and said transmitting device, that comprises a capacitor that charges itself with electrical energy in response to the mechanical stresses applied to said tyre.

Another aspect of the present invention relates to a vehicle wheel comprising a tyre, a supporting rim for said tyre, and a movable unit combined with said tyre comprising a device for sensing at least one characteristic parameter of said tyre and a device for transmitting out of the tyre a signal relating to said at least one characteristic parameter, characterized in that said movable unit comprises an electrical energy generating device capable of supplying said sensing device and said transmitting device, that comprises a capacitor that charges itself with electrical energy in response to the mechanical stresses applied to said tyre.

BRIEF DESCRIPTION OF THE DRAWINGS

Other features and advantages will be found in the detailed description of a preferred but not exclusive embodiment of the present invention in its various aspects.

This description will be given below with reference to the attached drawings, which are supplied purely for guidance and are therefore not limiting. In the drawings.

DETAILED DESCRIPTION OF THE EXEMPLARY EMBODIMENTS

Figure 1:
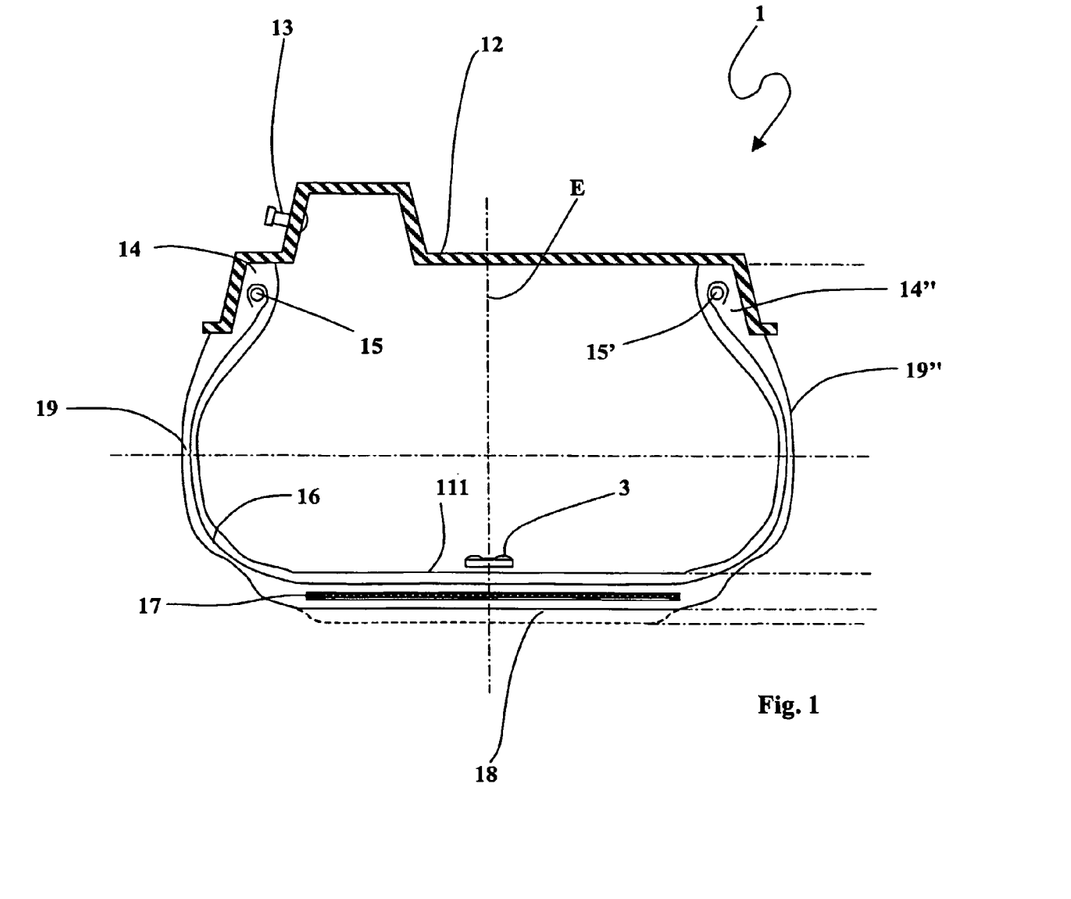
FIG. 1 is a cross section through a tyre mounted on its supporting rim with a movable unit inserted inside it.

FIG. 1 shows by way of example a wheel 1 comprising a tyre 11, of the type conventionally known as "tubeless", that is having no inner tube, and a supporting rim 12. This tyre is inflated through an inflation valve 13 which by way of example is positioned, in a manner known per se, on the drop centre of said rim.

The tyre consists of an internally hollow toroidal structure formed by a plurality of components—in the first place by a textile or metallic carcass having two beads 14 and 14' each defined along an internal circumferential edge of the carcass in order to hold the tyre on its supporting rim 12. Said carcass comprises at least one pair of annular reinforcing cores 15 and 15' known as bead wires, which are inserted in said beads.

The carcass includes a supporting structure made up of a reinforcing ply 16 containing textile or metallic cords. This ply is laid axially from one bead to the other to give a toroidal profile, and its edges are each connected to a corresponding bead wire.

In the so-called radial type of tyre, the above cords lie more or less in planes containing the axis of rotation of the tyre.

Forming a ring around this carcass are an annular structure 17, known as the belt structure, normally made up of one or more strips of rubberized fabric wound on top of each other to define a so-called "belt pack", and a tread band 18 of elastomeric material wrapped around the belt pack and moulded with a relief design for rolling contact of the tyre with the road. Two elastomeric side walls 19 and 19' are also placed on the carcass, in axially opposite lateral positions, each extending radially outwards from the outer edge of the corresponding bead.

In the so-called "tubeless" type of tyre, the inside surface of the carcass is normally covered with a liner 111, that is one or more layers of elastomeric material impermeable to air. Lastly, the carcass can include other known components, that is edges, shims and fillers depending on the particular design of the tyre.

Together, these components determine the mechanical characteristics of elasticity, stiffness and resistance to deformation of the tyre, which constitutes the connection between the system of forces applied to the tyre and the magnitude of the corresponding deformations it undergoes.

It should be pointed out that, for the purposes of the present description, the term "elastomeric material" means a compound formed from at least one polymer base appropriately amalgamated with reinforcing fillers and/or process additives of various types.

The system for monitoring characteristic parameters of a tyre fitted to a vehicle, according to the present invention, comprises a fixed unit 2 preferably located in said vehicle and a movable unit 3 combined with said tyre.

Figure 2:
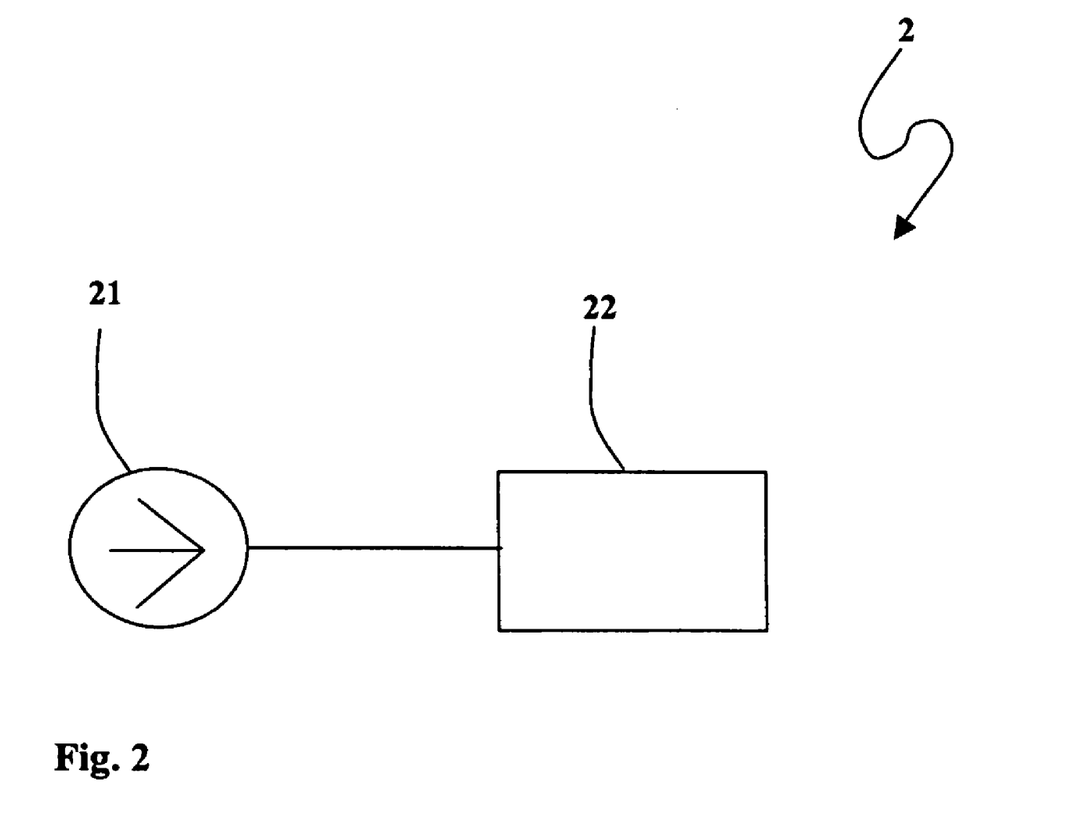
FIG. 2 is a block diagram of a fixed unit of said sensing system according to the invention combined with a vehicle.

FIG. 2 is a block diagram of said fixed unit 2, preferably comprising a receiving device 21 for receiving signals from said movable unit, and a receiving antenna 22.

The receiving device preferably comprises a radiofrequency receiver connected to said antenna and preferably also an electrical demodulator device.

The electrical energy required to supply said fixed unit may preferably be supplied directly by the battery of the vehicle via a suitable drive circuit (not shown). In addition, said fixed unit advantageously communicates with suitable devices mounted on board the vehicle for displaying said sensed parameters. For example, the inflation pressure may advantageously be displayed on the dashboard of the vehicle on a special display.

Figure 3:
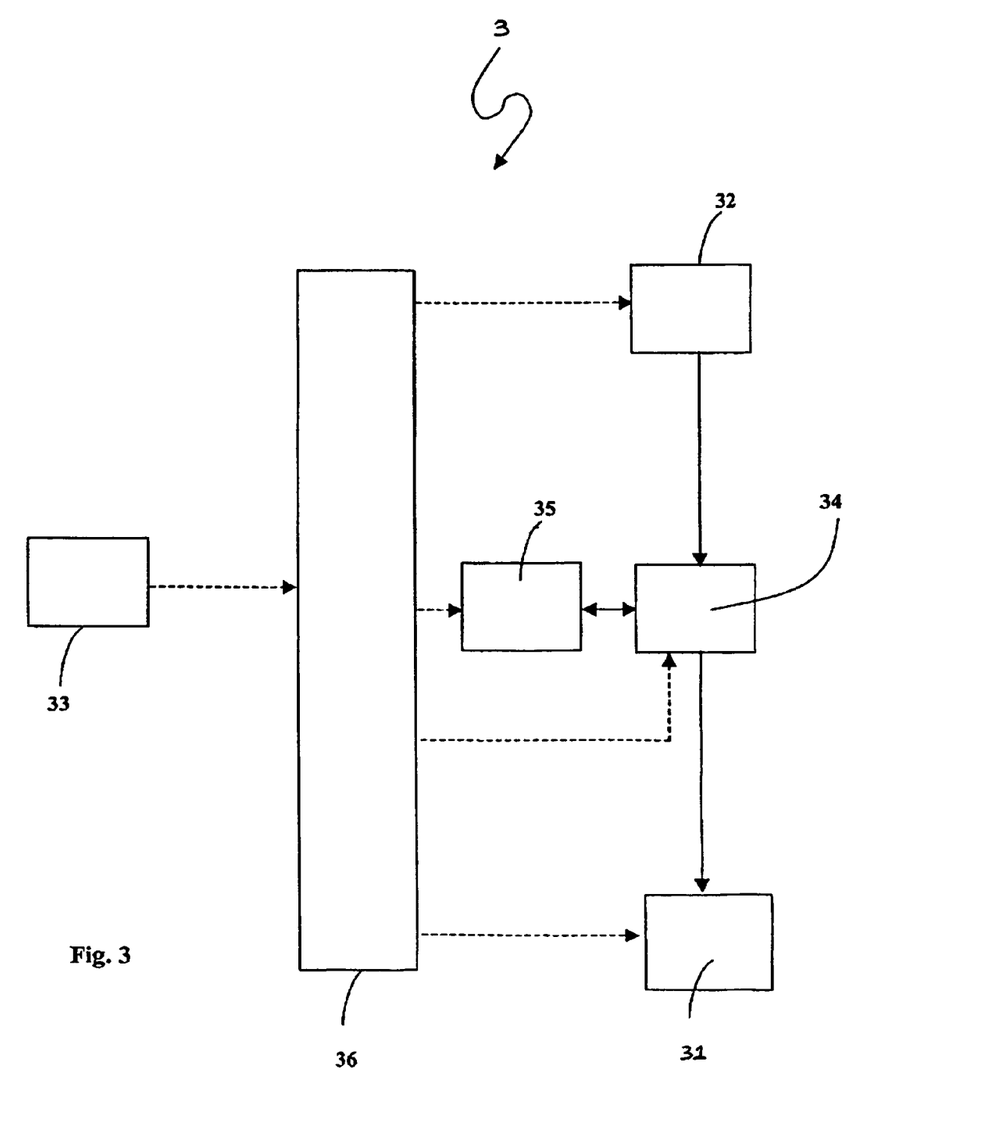
FIG. 3 is a block diagram of said movable unit of said sensing system according to the invention combined with a tyre.

Said movable unit 3, illustrated in a block diagram in FIG. 3, comprises a transmitting device 31 for transmitting signals to said fixed unit and a sensing device 32 for sensing characteristic parameters of a tyre—this comprises at least one sensor for measuring these parameters.

Examples of said at least one sensor are a pressure sensor, a temperature sensor, an acceleration sensor, a sensor of rotary movement (the number of revolutions of the tyre) or combinations of these.

This movable unit also includes a processing unit (processor) 34 and a memory device 35. This memory device may contain pre-stored instructions for the processing unit and may also contain rewritable memory locations in which information about the measurements taken by the sensors can be stored. A device for distributing the electrical energy 36 preferably distributes appropriately to said processing unit, said memory device, said device for transmitting to said fixed unit, and said device for sensing the electrical energy necessary for their operation.

Within this movable unit, the signals sensed by the sensors can be suitably coded or pre-processed for transmission out of the tyre. For example, they may be associated with a code identifying the particular tyre, to avoid confusion with similar signals coming from the other tyres of the vehicle.

In accordance with the present invention, this coding or pre-processing also makes it possible to send out of the tyre, by means of said transmission device, a pre-processed signal containing a quantity of information compatible with the capacity of a receiver outside of the tyre to interpret this signal in a meaningful way.

For the purposes of the present invention, meaningful interpretation of this signal means that from said signal a decoding device external to the tyre, e.g. contained in the fixed unit, is able to reconstruct the profile of the sensed signal in order to determine for example the minima and maxima.

An example of coding or pre-processing is set out below for a signal relating to the triaxial acceleration of a point on the tyre (with reference to a system of three Cartesian axes x, y and z).

This signal represents the three components of the acceleration of this point $a_x$, $a_y$ and $a_z$ relative to said system of three Cartesian axes. Said signal is preferably filtered (for example by a "low pass" filter to filter out the non-significant high frequencies). An RMS (Root Mean Square) calculation can also be performed, that is a calculation that gives an instantaneous indication of how much the maximum value of the signal differs from its mean value. Another processing step differentiates the signal with respect to time in order to find the maximum and its mean value. These processing steps are preferably carried out after the signal received from the corresponding sensor has been converted into a digital signal, as these digital operations can be done by software simply by retrieving from said memory a stored procedure containing instructions for said processing unit.

Having obtained values, expressed in digital form by a suitable number of bytes, in the example described, these are compared with each other to calculate the coefficient of friction between the tyre and the ground (and this in turn will be expressed by a suitable number of bytes). This number is sent to the transmitter, and the transmitter transmits it to the fixed unit mounted in the vehicle.

Other pre-processing steps are carried out for example on a signal corresponding to a pressure reading, which can be compared with a nominal correct inflation pressure for a given temperature pre-stored in this non-volatile memory. The result of this comparison may be sent out of the tyre only if the actual inflation pressure departs from the nominal pressure by a predetermined value.

This movable unit is preferably made by MEMS (Micro-Electro-Mechanical Systems) technology. This technology makes it possible to integrate mechanical and electronic components on the same substrate (wafer) in an extremely small amount of space. To make a device using MEMS technology, micromechanical structures integrated with electronic structures capable of controlling/processing the electrical signal connected with said mechanical structure are produced, by photolithography followed by chemical etching, on a substrate, preferably of silicon.

An example of MEMS technology is described, for example, in the document titled "Adapting multichip module foundries for MEMS packaging" published by the International Journal of Microcircuits and Electronic Packaging, Vol. 21. No. 2, pp. 212-218, published in 1998.

The main advantage of MEMS technology is the ability to create extremely small structures on a mass-production scale. For example, it is possible to produce simultaneously on a single wafer of silicon, thousands of copies of the same MEMS component. In addition, the individual components are advantageously made from single-crystal silicon and its oxide. In this way the quality of the surfaces obtained makes the characteristics of the components almost "ideal" in terms of mechanical strength.

By way of example, we set out below the steps necessary to create a MEMS accelerometer sensor which is made by creating a small "suspended mass" on the surface of said silicon wafer. These steps comprise:

drawing on said wafer, by photolithographic processes, an area that corresponds to the suspended mass and its support element;
  doping said area with chemical agents, such as boron or silicon oxide, and then immersing it in hydrofluoric acid to make it relatively inert to chemical etching;
  chemically etching the wafer to remove the silicon from around the mass and its support, creating an open channel around the mass;
  generating a small cavity, on which said mass is left suspended; and
  creating around said cavity, by processes similar to those used for the manufacture of integrated circuits, circuits capable of measuring the distance between the suspended mass and the bottom of the cavity in which it is inserted.

This distance corresponds to a measure of the force acting on the mass which deflects the support of the mass, and hence gives a measure of the acceleration.

An accelerometer produced by this method occupies a volume, inclusive of its control electronics, of no more than 2.5×2.5×0.25 mm. Thus, on a 6" silicon wafer, 1500-2000 accelerometers can be produced.

A pressure sensor contained in said sensing device can be produced by MEMS techniques, by creating a silicon diaphragm which is deformed by the pressure of the air inside the tyre acting on an exposed face. The deformation is measured as a change in the capacitance between the diaphragm and a fixed conducting surface.

An acceleration sensor can similarly be produced by MEMS techniques, by inserting into a silicon diaphragm a mass which, when subjected to acceleration, undergoes the action of a force equal to the product of the mass under the acceleration. As before, the deformation of the diaphragm can be measured as a change in capacitance.

In general, all the abovementioned sensors can be made by MEMS technology on the same substrate. Similarly, MEMS technologies can be used to produce on this substrate in accordance, for example, with the diagram FIG. 4, all the devices that comprise the movable station.

Figure 4:
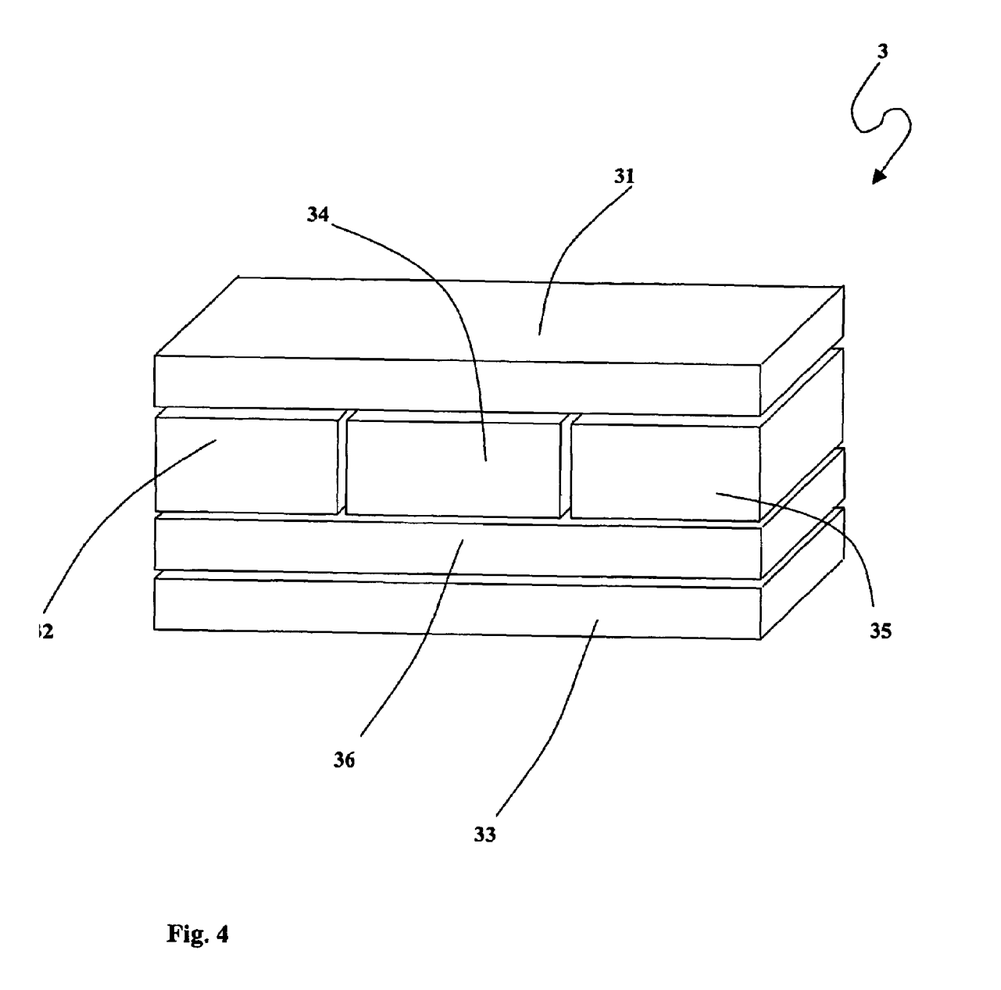
FIG. 4 is a schematic 3-dimensional exploded view of said movable unit.

One possible structure for said movable unit is described in FIG. 4. In particular, said movable unit is preferably made on a substrate, on which the various components are arranged.

The movable unit in FIG. 4 preferably comprises an electrical energy-generating device 33 that generates electrical energy in response to the stresses to which the movable unit is subjected (such as centrifugal force or the deformations of the inner surface of the tyre). This device is preferably made on the same substrate as the sensors, the processing unit (processor) 34 and the memory device 35.

The device can be made using a MEMS technology. In particular, it is known from the document titled "Development of an Electromagnetic Microgenerator" published in the journal Electronics Letters, August 1997 that as soon as two plates of a capacitor move with respect to each other, provided the electric charge (previously supplied to the capacitor) passing through the plates is constant, the voltage between the two plates increases.

In accordance with the present invention, a system is produced inside this substrate in which one plate of the capacitor is fixed and the second is connected to a damping spring. When a vibration is applied to the "oscillating" surface of the second plate, the capacitor pumps electrical energy from a low potential level to a higher level. The higher potential can advantageously then be stored in an isolated capacitive vessel for use as necessary.

Figure 5:
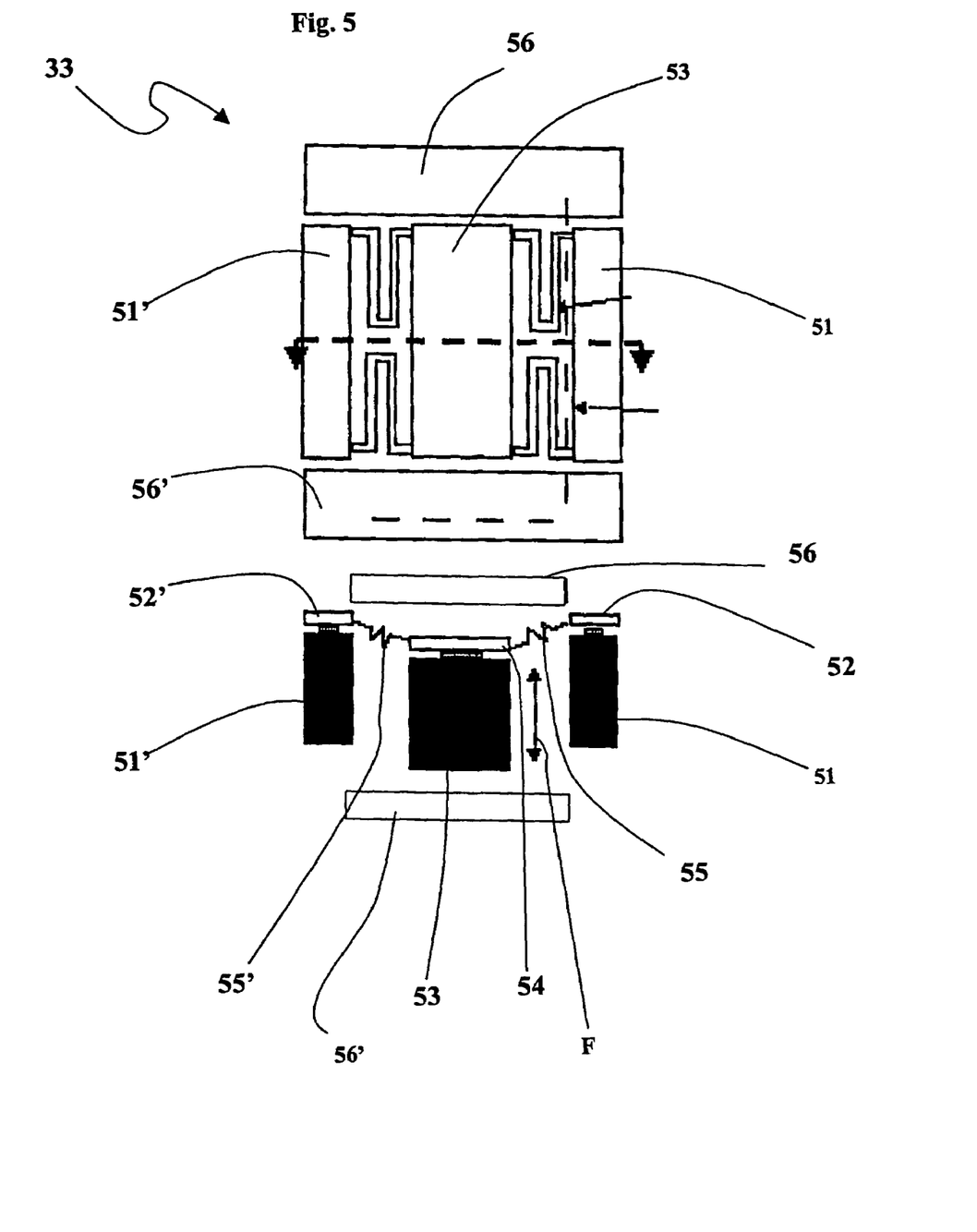
FIG. 5 is a schematic exploded view of a device for generating electrical energy built into said movable unit.

An example of this device created on a substrate as described above is illustrated in FIG. 5. This device comprises two fixed supports 51, 51', to each of which a fixed metal plate 52 or 52' is attached, and a movable support 53 to which a movable metal plate 54 is attached.

Said movable support is connected to said two fixed supports by two springs 55 and 55'. This pair of springs allows the movable support 53 and the movable plate 54 to move in two directions, indicated in FIG. 5 by the double arrow F. The movement of this movable support in said direction is limited by two opposing end stops 56 and 56'. Said two fixed supports 51, 51' are preferably attached to said substrate (not shown in FIG. 5). When the tyre is rolling, the stresses to which it is subject bring about the abovementioned movement of the movable plate relative to the two fixed plates, generally in the two directions of the double arrow F, FIG. 5. The movable and fixed plates form a capacitor having a predetermined charge capacity. The capacitor can be pre-charged before the movable unit is placed in the tyre by briefly supplying a voltage to the capacitor. The stresses acting on the moving tyre, especially those due to the acceleration and deceleration of the tyre, generate the abovementioned movement of the plates setting up a potential difference at the terminals of the capacitor. The potential difference obtained is stored in the distribution device 36 which makes it available to the other devices of the movable unit.

The substrate may be large covered by an external coating that extends preferably over the entire surface area of said movable unit except for a portion corresponding to the position of the sensitive areas of the sensors, as these areas must be in communication with the volume in which said characteristic parameters are being measured.

This external coating serves to produce an essentially stable bond between said movable unit and the inner surface of the tyre.

This movable unit is preferably attached to the inner surface of the tyre in the crown area of the tyre by a suitable adhesive which will ensure that the abovementioned stresses acting on the tyre do not detach the unit from the inner surface of the tyre.

The movable unit is small and lightweight. It weighs preferably less than 5 grams and has a maximum occupied volume of 2 cm$^3$. Such a movable unit will not influence the balance of the tyre when rotating.

The invention claimed is:

1. A system for sensing at least one characteristic parameter of a tyre fitted to a vehicle, comprising:
    a movable unit; and
    a fixed unit;
    wherein the movable unit is combined with the tyre,
    wherein the movable unit comprises:
        a device for sensing the at least one characteristic parameter;
        a device for transmitting a signal out of the tyre; and
        a device for generating electrical energy;
    wherein the signal relates to the at least one characteristic parameter,
    wherein the fixed unit is combined with the vehicle,
    wherein the fixed unit comprises a device for receiving signals from the movable unit,
    wherein the electrical energy generating device is capable of supplying electrical energy to the sensing device,
    wherein the electrical energy generating device is capable of supplying electrical energy to the transmitting device,
    wherein the electrical energy generating device comprises a capacitor, the capacitor being charged with electrical energy in response to mechanical stresses applied to the tyre, and
    wherein the capacitor comprises two plates moving with respect to each other in response to the mechanical stresses.

2. The system of claim 1, wherein the capacitor comprises:
    a fixed plate; and
    a movable plate;
    wherein the fixed plate and the movable plate move with respect to each other in response to the mechanical stresses.

3. The system of claim 2, wherein a distance between the fixed plate and the movable plate can vary in response to the mechanical stresses.

4. The system of claim 2, wherein the fixed plate and the movable plate are connected to each other by a pair of springs.

5. The system of claim 2, wherein the fixed plate is connected to a fixed support, and
    wherein the movable plate is connected to a movable support.

6. The system of claim 2, wherein movement of the movable plate is bounded by a pair of end-stop elements.

7. The system of claim 1, wherein the sensing device, the transmitting device, and the generating device are produced on a substrate.

8. The system of claim 7, wherein the movable unit is produced by micro-electro-mechanical systems (MEMS) technology.

9. The system of claim 7, wherein a processing unit is also produced on the substrate.

10. The system of claim 9, wherein the movable unit is produced by micro-electro-mechanical systems (MEMS) technology.

11. The system of claim 7, wherein a memory device is also produced on the substrate.

12. The system of claim 11, wherein the movable unit is produced by micro-electro-mechanical systems (MEMS) technology.

13. The system of claim 7, wherein an electrical energy distributing device is also produced on the substrate.

14. The system of claim 13, wherein the movable unit is produced by micro-electro-mechanical systems (MEMS) technology.

15. The system of claim 7, wherein a processing unit and a memory device are also produced on the substrate.

16. The system of claim 15, wherein the movable unit is produced by micro-electro-mechanical systems (MEMS) technology.

17. The system of claim 7, wherein a processing unit, a memory device, and an electrical energy distributing device are also produced on the substrate.

18. The system of claim 17, wherein the movable unit is produced by micro-electro-mechanical systems (MEMS) technology.

19. A movable unit for sensing at least one characteristic parameter of a tyre fitted to a vehicle, comprising:
    a device for sensing the at least one characteristic parameter;
    a device for transmitting a signal out of the tyre; and
    a device for generating electrical energy;
    wherein the signal relates to the at least one characteristic parameter,
    wherein the electrical energy generating device is capable of supplying electrical energy to the sensing device,
    wherein the electrical energy generating device is capable of supplying electrical energy to the transmitting device,
    wherein the electrical energy generating device comprises a capacitor, the capacitor being charged with electrical energy in response to mechanical stresses applied to the tyre, and
    wherein the capacitor comprises two plates moving with respect to each other in response to the mechanical stresses.

20. A vehicle wheel, comprising:
    a tyre;
    a supporting rim for the tyre; and
    a movable unit combined with the tyre;
    wherein the movable unit comprises:
        a device for sensing at least one characteristic parameter of the tyre;
        a device for transmitting a signal out of the tyre; and
        a device for generating electrical energy;
    wherein the signal relates to the at least one characteristic parameter, wherein the electrical energy generating device is capable of supplying electrical energy to the sensing device, wherein the electrical energy generating device is capable of supplying electrical energy to the transmitting device, wherein the electrical energy generating device comprises a capacitor that, the capacitor being charged with electrical energy in response to mechanical stresses applied to the tyre, and wherein the capacitor comprises two plates moving with respect to each other in response to the mechanical stresses.

* * * * *

UNITED STATES PATENT AND TRADEMARK OFFICE
CERTIFICATE OF CORRECTION

PATENT NO. : 7,243,533 B2 Page 1 of 1
APPLICATION NO. : 10/518795
DATED : July 17, 2007
INVENTOR(S) : Mancosu et al.

It is certified that error appears in the above-identified patent and that said Letters Patent is hereby corrected as shown below:

Column 11, line 7, delete "that".

Signed and Sealed this

Twenty-fifth Day of December, 2007

JON W. DUDAS
*Director of the United States Patent and Trademark Office*